United States Patent [19]
Kadohara

[11] Patent Number: 5,909,598
[45] Date of Patent: *Jun. 1, 1999

[54] VIEWFINDER DISPLAY DEVICE

[75] Inventor: Terutake Kadohara, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/871,286

[22] Filed: Jun. 9, 1997

Related U.S. Application Data

[63] Continuation of application No. 08/539,484, Oct. 5, 1995, abandoned.

[30] Foreign Application Priority Data

Oct. 13, 1994 [JP] Japan .................................. 6-247757

[51] Int. Cl.⁶ ........................................................ G03B 3/00
[52] U.S. Cl. ............................................. 396/296; 396/121
[58] Field of Search ................................... 396/296, 121, 396/148, 232

[56] References Cited

U.S. PATENT DOCUMENTS

| 4,509,848 | 4/1985 | Katsuma et al. | 354/473 |
| 4,597,659 | 7/1986 | Suda et al. | 354/409 |
| 4,692,014 | 9/1987 | Kiuchi | 354/471 |
| 4,711,547 | 12/1987 | Iizuka | 354/471 |
| 5,004,902 | 4/1991 | Matsui et al. | 354/406 |
| 5,126,777 | 6/1992 | Akashi et al. | 354/402 |
| 5,235,380 | 8/1993 | Yamada et al. | 354/471 |
| 5,333,031 | 7/1994 | Mukai | 354/442 |
| 5,404,193 | 4/1995 | Harada | 354/409 |
| 5,485,003 | 1/1996 | Kusada | 396/147 |
| 5,515,131 | 5/1996 | Ohmori et al. | 354/410 |

Primary Examiner—Safet Metjahic
Assistant Examiner—Michael Dalakis
Attorney, Agent, or Firm—Robin, Blecker & Daley

[57] ABSTRACT

A viewfinder display device comprises a viewfinder optical system and a display structure disposed to be superimposed on a viewfinder optical image in the viewfinder optical system, and the display structure is arranged to divide a viewfinder display area into a plurality of small areas and is capable of selectively varying a transmittance of each of the plurality of small areas.

12 Claims, 18 Drawing Sheets

FIG.3

| SPC - 6 | SPC - 4 | SPC - 7 |
|---------|---------|---------|
| SPC - 2 | SPC - 1 | SPC - 3 |
| SPC - 8 | SPC - 5 | SPC - 9 |

FIG.8

| FF-6 | FF-4 | FF-7 |
| FF-2 | FF-1 | FF-3 |
| FF-8 | FF-5 | FF-9 |

FIG.16

| SPC-6 | SPC-7 | SPC-4 | SPC-8 | SPC-9 |
|---|---|---|---|---|
| SPC-10 | SPC-2 | SPC-1 | SPC-3 | SPC-11 |
| SPC-12 | SPC-13 | SPC-5 | SPC-14 | SPC-15 |

…

VIEWFINDER DISPLAY DEVICE

This is a continuation under 37 CFR 1.62 of prior application Ser. No. 08/539,484, filed Oct. 5, 1995, abandoned.

BACKGROUND OF THE INVENTION

1. Field of the Invention

The present invention relates to a viewfinder display device for the observation of an object.

2. Description of the Related Art

It has been proposed to provide various kinds of transmission viewfinder display devices for use in a photographic apparatus, such as a camera, which are arranged to display in a superimposed manner an automatic focus detecting area, an automatic exposure measuring area, a panoramic photography area, a parallax between the range of photography and the field of view of a viewfinder and the like.

Normally, these displays can be switched in accordance with the alteration of each individual setting condition, and the range and area of operation of each function of the photographic apparatus is displayed so that a photographer can be given assistance in performing photography.

U.S. Pat. No. 5,404,193 and others disclose a particularly convenient arrangement capable of displaying a focus detecting point in a superimposed manner when an in-focus state is detected at that focus detecting point.

It is also known that a viewfinder for a single-lens reflex camera or the like has a very useful function which enables a user to directly confirm the state of focus adjustment.

SUMMARY OF THE INVENTION

It is, therefore, an object of the present invention to provide a viewfinder display device which includes display means arranged to divide a viewfinder display area into a plurality of areas and capable of selectively varying the transmittance of each of the areas, so that a display having a meaning can be provided in each of the areas by making the transmittance of a particular area different from that of other areas in the display means.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3 is a diagram showing the area division of a light measuring device according to the first embodiment of the present invention;

FIG. 8 is a view of a display state of the viewfinder display device according to the first embodiment of the present invention;

FIG. 16 is a diagram of the area division of a light measuring device according to the second embodiment of the present invention;

DETAILED DESCRIPTION OF THE PREFERRED EMBODIMENTS

Preferred embodiments of the present invention will be described below with reference to the accompanying drawings.

A first embodiment of the present invention will be described below.

Figure 1:
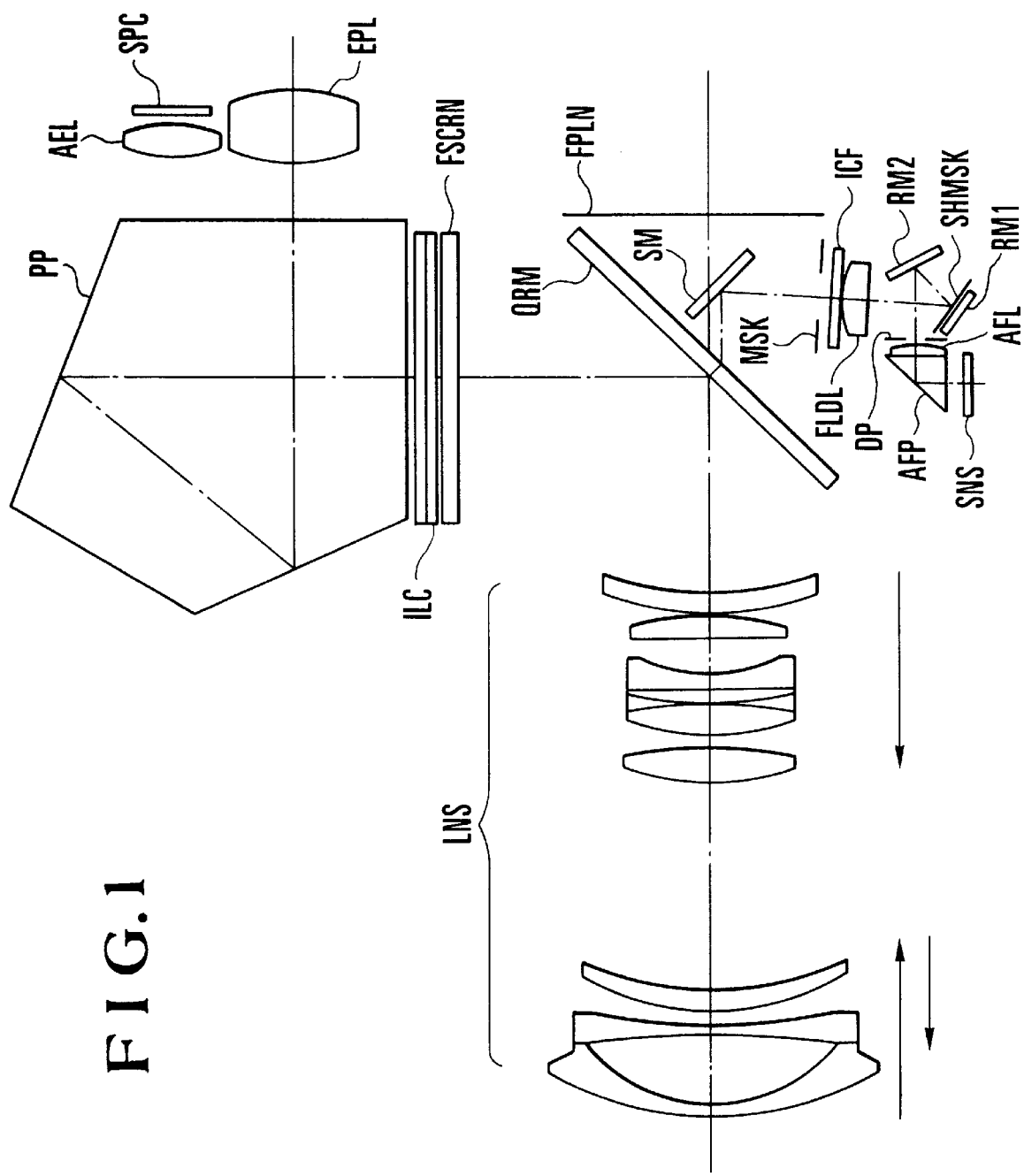
FIG. 1 is a schematic diagram showing the in-camera arrangement of each device according to a first embodiment of the present invention.

FIG. 1 diagrammatically shows the internal construction of a camera provided with a liquid crystal viewfinder display device, a focus detecting device and a light measuring device.

The shown camera includes a photographing zoom lens LNS, a quick return mirror QRM, a focusing screen FSCRN, a liquid crystal device ILC disposed in the vicinity of an image forming position in an viewfinder optical system, a pentagonal prism PP, a light measuring (image forming) lens AEL, a light measuring sensor SPC, an eyepiece lens EPL, a film plane FPLN, a sub-mirror SM, a field mask MSK, an infrared cut-filter ICF, a field lens FLDL, a first reflection mirror RM1, a second reflection mirror RM2, a shield mask SHMSK, a diaphragm DP, a secondary image forming lens AFL, a prism member AFP having a reflection plane and an exit plane, and a sensor unit SNS for focus detection, which has a cover glass and a light sensing plane.

The prism member AFP has the reflection plane AFP-1 coated with an evaporated metal reflection film, such as an aluminum film, and has the function of reflecting a light flux conducted from the secondary image forming lens AFL and deflecting the light flux toward the exit plane AFP-2.

Figure 2:
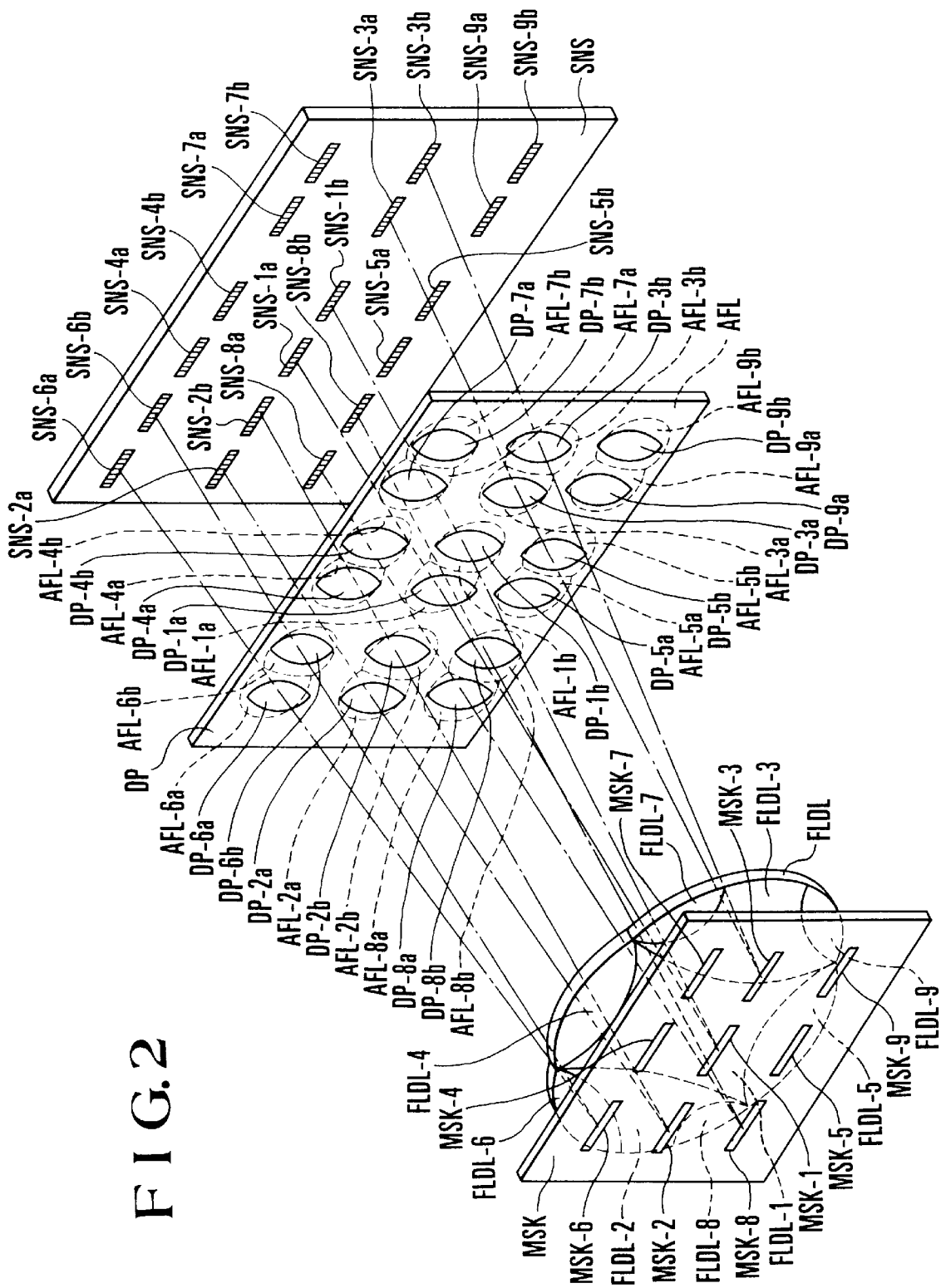
FIG. 2 is a diagrammatic view showing the construction of a focus detecting device according to the first embodiment of the present invention.

FIG. 2 diagrammatically shows the construction of the focus detecting device.

As shown in FIG. 2, the field mask MSK has an opening MSK-1 in the center, two openings MSK-2 and MSK-3 on the left and right sides of the opening MSK-1, two openings MSK-4 and MSK-5 above and below the opening MSK-1, and openings MSK-6, MSK-7, MSK-8 and MSK-9 in the four corners of the field of view.

The field lens FLDL includes nine areas FLDL-1 to FLDL-9 which respectively correspond to the nine openings MSK-1 to MSK-9 of the field mask MSK.

The diaphragm DP has a pair of openings DP-1$a$ and DP-1$b$ in the center, two pairs of openings DP-2$a$ and DP-2$b$; DP-3$a$ and DP-3$b$ in the left and right side portions, two pairs of openings DP-4$a$ and DP-4$b$; DP-5$a$ and DP-5$b$ above and below the central pair of openings DP-1$a$ and DP-1$b$, and four pairs of openings DP-6$a$ and DP-6$b$; DP-7$a$ and DP-7$b$; DP-8$a$ and DP-8$b$; and DP-9$a$ and DP-9$b$ in the four corners.

The respective areas FLDL-1 to FLDL-9 of the field lens FLDL have the functions of focusing light fluxes passing through the corresponding pairs of openings DP-2$a$ and DP-2$b$ to DP-9$a$ and DP-9$b$ of the diaphragm DP in the vicinity of the exit pupil of an objective lens (not shown). Specifically, the areas FLDL-1, FLDL-2, FLDL-3, FLDL-4, FLDL-5, FLDL-6, FLDL-7, FLDL-8 and FLDL-9 respectively focus light fluxes passing through opening pairs DP-1, DP-2, DP-3, DP-4, DP-5, DP-6, DP-7, DP-8 and DP-9.

The secondary image forming lens AFL includes nine pairs of lenses AFL-1$a$ and AFL-1$b$ to AFL-9$a$ and AFL-9$b$, and is disposed behind the diaphragm DP in such a manner that the nine pairs of lenses AFL-1$a$ and AFL-1$b$ to AFL-9$a$ and AFL-9$b$ correspond to the nine opening pairs DP-1, DP-2, DP-3, DP-4, DP-5, DP-6, DP-7, DP-8 and DP-9, respectively.

The sensor unit SNS includes nine pairs of sensor arrays SNS-1$a$ and SNS-1$b$ to SNS-9$a$ and SNS-9$b$ which are respectively disposed to receive images conducted through the corresponding nine pairs of lenses AFL-1$a$ and AFL-1$b$ to AFL-9$a$ and AFL-9$b$ of the secondary image forming lens AFL. These pairs of sensor arrays SNS-1$a$ and SNS-1$b$ to SNS-9$a$ and SNS-9$b$ are disposed with respect to a photographic image plane in such a manner that the pair of sensor arrays SNS-1$a$ and SNS-1$b$ correspond to its central detection area, the pairs of sensor arrays SNS-2$a$ and SNS-2$b$; SNS-3$a$ and SNS-3$b$ correspond to its left and right detection areas, the pairs of sensor arrays SNS-4$a$ and SNS-4$b$; SNS-5$a$ and SNS-5$b$ correspond to its upper and lower detection areas, and the four pairs of sensor arrays SNS-6$a$ and SNS-6$b$ to SNS-9$a$ and SNS-9$b$ correspond to its four corner detection areas.

In the focus detecting device shown in FIG. 2, if the focus of the photographing zoom lens LNS deviates forward from a film plane, two subject images which are formed on each of the pairs of sensor arrays SNS-1$a$ and SNS-1$b$ to SNS-9$a$ and SNS-9$b$ are displaced toward each other, whereas if the focus deviates backward from the film plane, such two subject images are displaced away from each other. The amount of displacement of the relative position between the two subject images has a special functional relationship with the amount of focus deviation of the photographing zoom lens LNS. Therefore, by performing appropriate computations on sensor outputs obtainable from the respective sensor-array pairs, it is possible to detect the amount of focus deviation of the photographing zoom lens LNS, i.e., the amount of defocus.

FIG. 3 is a schematic view showing the arrangement of area division of the light measuring sensor SPC for exposure control which is arranged to receive light from a subject through the photographing zoom lens LNS.

As shown in FIG. 3, the light receiving plane of the light measuring sensor SPC is divided into nine areas which respectively correspond to the aforesaid nine distance measuring (focus detecting) areas into which the field of view (the photographic image plane) are divided. Specifically, the light receiving plane of the light measuring sensor SPC includes a central area SPC-1, left and right areas SPC-2 and SPC-3, upper and lower areas SPC-4 and SPC-5, and four corner areas SPC-6 to SPC-9. Each of these areas SPC-1 to SPC-9 is placed in an image forming relationship with the focusing screen FSCRN through the pentagonal prism PP and the liquid crystal device ILC by the light measuring lens AEL of FIG. 1.

Figure 4:
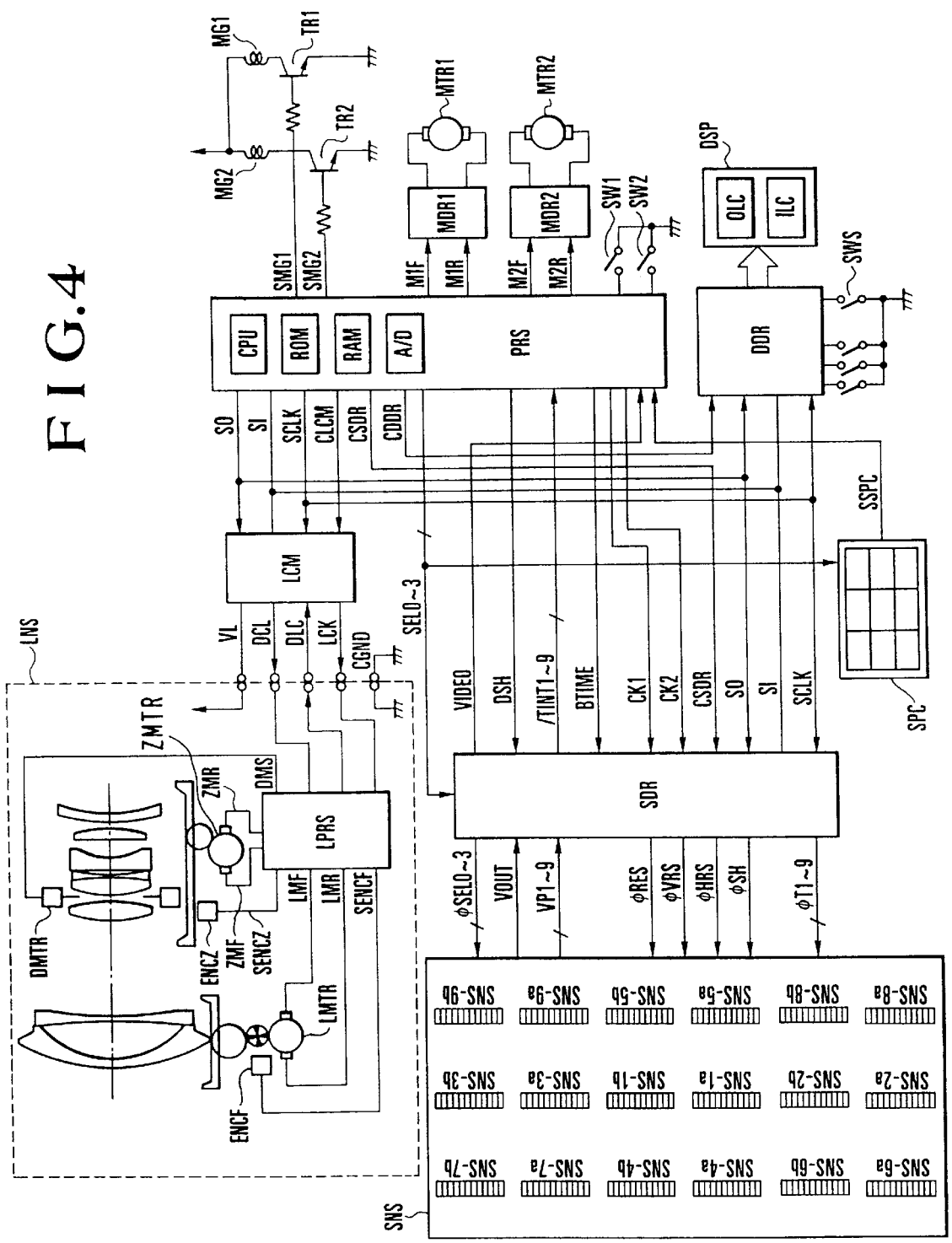
FIG. 4 is a circuit diagram of a camera system according to the first embodiment of the present invention.

FIG. 4 is a circuit diagram showing one specific example of the construction of the camera provided with the devices which are shown in FIGS. 1, 2 and 3. First of all, the construction of each part will be described below.

As shown in FIG. 4, a control device PRS for the camera is, for example, a one-chip microcomputer which has in its inside a CPU (central processing unit), a ROM, a RAM and an A/D conversion function. The control device PRS performs a series of camera operations, such as an automatic exposure control function, an automatic focus adjustment function and winding and rewinding of film, in accordance with the sequence program for the camera stored in the ROM. To execute such a series of camera operations, the control device PRS communicates with peripheral circuits incorporated in a camera body and an in-lens control device by employing communication signals SO, SI and SCLK as well as communication selecting signals CLCM, CSDR and CDDR, thereby controlling the operations of each individual circuit and the photographing zoom lens LNS.

The communication signal SO is a data signal to be outputted from the control device PRS, the communication signal SI is a data signal to be inputted to the control device PRS, and the communication signal SCLK is a synchronizing signal for the signals SO and SI.

A lens communication buffer circuit LCM supplies electrical power to a lens power source terminal VL while the camera is operating. If the communication selecting signal CLCM supplied from the control device PRS is at its high potential level (hereinafter referred to as "H"; a low potential level is hereinafter referred to as "L"), the lens communication buffer circuit LCM serves as a communication buffer between the camera and the photographing zoom lens LNS.

If the control device PRS sets the signal CLCM to "H" and transmits predetermined data as the signal SO in synchronism with the clock signal SCLK, the buffer circuit LCM outputs buffered signals LCK and DCL, which correspond to the respective signals SCLK and SO, to the photographing zoom lens LNS through the corresponding camera-lens communication contacts. At the same time, the buffer circuit LCM receives a signal DLC supplied from the photographing zoom lens LNS and outputs the resultant buffered signal as the signal SI. The control device PRS receives the signal SI indicative of lens data in synchronism with the clock signal SCLK.

A circuit DDR is provided for detecting and displaying the state of each individual switch SWS. If the signal CDDR is "H", the circuit DDR is selected and is controlled by the control device PRS by using the signals SO, SI and SCLK. Specifically, the circuit DDR changes the contents displayed on a display member DSP of the camera on the basis of data supplied from the control device PRS, or informs the control device PRS of the on/off state of each individual operating member of the camera through communication. The display member DSP includes an external liquid crystal display OLC located on the top of the camera and an liquid crystal display ILC provided in the viewfinder of the camera.

Switches SW1 and SW2 are interlocked with a release button (not shown). When the release button is depressed to a first stroke position, the switch SW1 is turned on, and when it is depressed to a second stroke position, the switch SW2 is turned on. The control device PRS executes light measurement and automatic focus adjustment when the switch SW1 is turned on, and, after the switch SW2 is turned on, executes exposure control and the subsequent film winding.

The switch SW2 is connected to an interrupt input terminal of the control device PRS which is a microcomputer. Even while the switch SW1 is on and the control device PRS is executing the program, if the switch SW2 is turned on to cause an interrupt, the control device PRS can immediately transfer control to a predetermined interrupt program.

A motor MTR1 is provided for transporting film, and a motor MTR2 is provided for moving the quick return mirror QRM to its mirror-up position (mirror-retracted position) and its mirror-down position (mirror-inserted position) and for charging a shutter spring. The motors MTR1 and MTR2 are reversibly driven by driving circuits MDR1 and MDR2, respectively. Signals M1F and M1R; M2F and M2R, which are respectively inputted to the driving circuits MDR1 and MDR2, are motor control signals.

Magnets MG1 and MG2 are respectively provided for causing shutter leading and trailing curtains to start running. The magnets MG1 and MG2 are respectively energized by amplifying transistors TR1 and TR2 in response to signals SMG1 and SMG2, and shutter control is performed by the control device PRS.

Since none of the driving circuits MDR1 and MDR2 and the shutter control directly relates to the present invention, the detailed description thereof is omitted herein.

The signal DCL which is inputted to an in-lens control circuit LPRS in synchronism with the signal LCK is data indicative of each individual instruction which is transmitted from the camera to the photographing zoom lens LNS. The operation of the photographing zoom lens LNS which corresponds to each instruction is determined in advance. The control circuit LPRS analyzes the input instruction in accordance with a predetermined procedure, and performs operations such as focus adjustment and diaphragm control and outputs as the signal DLC the operation status of each part of the photographing zoom lens LNS (such as the status of driving of its focus adjusting optical system and the state of driving of its diaphragm) and various parameters (fully open F-number, focal length, a coefficient of the amount of defocus versus the amount of movement of the focus adjusting optical system).

The operation of the photographing zoom lens LNS which is used in the shown embodiment by way of example will be described below. If an instruction indicative of focus adjustment is transmitted from the camera to the photographing zoom lens LNS, the control circuit LPRS drives a focus adjusting motor LMTR by means of signals LMF and LMR in accordance with simultaneously transmitted data indicative of the amount and direction in which to drive the motor LMTR. The motor LMTR causes the optical system to move along the optical axis thereof, thereby effecting focus adjustment. The amount of movement of the optical system is detected by a photocoupler arranged to detect the pattern of a pulse plate which turns in interlocking relationship to the optical system, and an encoder circuit ENCF outputs a pulse signal SENCF consisting of the number of pulses which corresponds to the detected amount of movement. The control circuit LPRS monitors the signal SENCF and counts it by a counter incorporated in the control circuit LPRS. When a predetermined operation is completed, the control circuit LPRS itself resets each of the signals LMF and LMR to "L" to brake the motor LMTR.

Accordingly, after the instruction indicative of focus adjustment is transmitted from the camera, the control device PRS of the camera need not at all take part in lens driving, until the lens driving is completed. The control circuit LPRS is also capable of transmitting the contents of the counter to the camera.

If an instruction (DMS) indicative of diaphragm control is transmitted from the camera to the photographing zoom lens LNS, the control circuit LPRS drives a known stepping motor DMTR for driving the diaphragm, in accordance with the simultaneously transmitted number of steps by which to stop down the diaphragm.

Incidentally, since the stepping motor DMTR can be operated under open-loop control, there is no need to use an encoder for monitoring the operation of the stepping motor DMTR.

The zooming optical system of the photographing zoom lens LNS is accompanied by an encoder circuit ENCZ. Zoom motor ZMTR is driven by signals ZMF and ZMR. The control circuit LPRS receives a signal SENCZ from the encoder circuit ENCZ and detects a zoom position. Lens parameters corresponding to individual zoom positions are stored in the control circuit LPRS, and if transmission of a parameter is requested by the control device PRS incorporated in the camera, the control circuit LPRS transmits a parameter corresponding to the current zoom position.

The light measuring sensor SPC selects any one of the divided areas SPC-1 to SPC-9 in accordance with signals SEL0 to SEL3 transmitted from the control device PRS and outputs a signal SSPC to an analog input terminal of the control device PRS. After A/D conversion, the signal SSPC is employed for automatic exposure control in accordance with a predetermined program.

Specifically, the light measuring sensor SPC selects the area SPC-1 when SLE0="H", SEL1="L", SEL2="L" and SEL3="L"; the area SPC-2 when SLE0="L", SEL1="H", SEL2="L" and SEL3="L"; the area SPC-3 when SLE0="H", SEL1="H", SEL2="L" and SEL3="L"; the area SPC-4 when SLE0="L", SEL1="L", SEL2="H" and SEL3="L"; the area SPC-5 when SLE0="H", SEL1="L", SEL2="H"

and SEL3="L"; the area SPC-6 when SLE0="L", SEL1="H", SEL2="H" and SEL3="L"; the area SPC-7 when SLE0="H", SEL1="H", SEL2="H" and SEL3="L"; the area SPC-8 when SLE0="L", SEL1="L", SEL2="L" and SEL3="H"; and the area SPC-9 when SLE0="H", SEL1="L", SEL2="L" and SEL3="H".

A driving circuit SDR is provided for driving the line-sensor unit SNS for focus detection, which is made up of CDDs or the like. If the signal CSDR is "H", the driving circuit SDR is selected, and is controlled by the control device PRS by using the signals SO, SI and SCLK.

Signals $\phi$SEL0 to $\phi$SEL3 to be transmitted from the driving circuit SDR to the sensor unit SNS are equivalent to the SEL0 to SEL3 supplied from the control device PRS. The sensor unit SNS selects the sensor-array pair SNS-1 (SNS-1a and SNS-1b) when $\phi$SEL0="H", $\phi$SEL1="L", $\phi$SEL2="L" and $\phi$SEL3="L"; the sensor-array pair SNS-2 (SNS-2a and SNS-2b) when $\phi$SEL0="L", $\phi$SEL1="H", $\phi$SEL2="L" and $\phi$SEL3="L"; the sensor-array pair SNS-3 (SNS-3a and SNS-3b) when $\phi$SEL0="H", $\phi$SEL1="H", $\phi$SEL2="L" and $\phi$SEL3="L"; the sensor-array pair SNS-4 (SNS-4a and SNS-4b) when $\phi$SEL0="L", $\phi$SEL1="L", $\phi$SEL2="H" and $\phi$SEL3="L"; the sensor-array pair SNS-5 (SNS-5a and SNS-5b) when $\phi$SEL0="H", $\phi$SEL1="L", $\phi$SEL2="H" and $\phi$SEL3="L"; the sensor-array pair SNS-6 (SNS-6a and SNS-6b) when $\phi$SEL0="L", $\phi$SEL1="H", $\phi$SEL2="H" and $\phi$SEL3="L"; the sensor-array pair SNS-7 (SNS-7a and SNS-7b) when $\phi$SEL0="H", $\phi$SEL1="H", $\phi$SEL2="H" and $\phi$SEL3="L"; the sensor-array pair SNS-8 (SNS-8a and SNS-8b) when $\phi$SEL0="L", $\phi$SEL1="L", $\phi$SEL2="L" and $\phi$SEL3="H"; and the sensor-array pair SNS-9 (SNS-9a and SNS-9b) when $\phi$SEL0="H", $\phi$SEL1="L", $\phi$SEL2="L" and $\phi$SEL3="H".

After the completion of storage of electric charge, the control device PRS appropriately sets the signals SEL0 to SEL3 and the driving circuit SDR outputs clock signals $\phi$SH and $\phi$HRS, so that the image signals obtained in the sensor-array pairs selected according to the signals SEL0 to SEL3 ($\phi$SEL0 to $\phi$SEL3) are serially outputted as an output signal VOUT.

Monitor signals VP1 to VP9 are respectively outputted from subject-luminance monitoring sensors disposed in the vicinity of the respective sensor-array pairs SNS-1 (SNS-1a and SNS-1b) to SNS-9 (SNS-9a and SNS-9b). When the sensor-array pairs SNS-1 to SNS-9 start to store electric charge, the voltages of the respective monitor signals VP1 to VP9 start to rise, and the storage of electric charge in the respective sensor-array pairs is controlled on the basis of the monitor signals VP1 to VP9.

Signals $\phi$RES and $\phi$VRS are sensor reset clock signals, signals $\phi$HRS and $\phi$SH are image-signal readout clock signals, and signals $\phi$T0 and $\phi$T9 are clock signals for ending the storage of electric charge in the respective sensor-array pairs.

An output signal VIDEO of the driving circuit SDR is an image signal obtained by finding a difference between the image signal VOUT and the dark current output of the sensor unit SNS and amplifying the difference in accordance with a gain determined by the luminance of a subject. The dark current output is an output value obtained by shielding part of the pixels of each of the sensor arrays from light. The driving circuit SDR holds the dark current output in its capacitor in accordance with a signal DSH supplied from the control device PRS, and performs differential amplification to amplify the difference between the dark current output and the image signal VOUT. The output signal VIDEO is inputted to an analog input terminal of the control device PRS, and the control device PRS converts the signal VIDEO into a digital signal and sequentially stores the digital signal at predetermined addresses on the RAM.

Signals /TINT1 to /TINT9 indicate that the respective sensor-array pairs SNS-1 (SNS-1a and SNS-1b) to SNS-9 (SNS-9a and SNS-9b) have finished storing proper amounts of electric charge. The control device PRS receives the signals /TINT1 to /TINT9 and performs readout of the image signals obtained from the respective sensor-array pairs SNS-1 to SNS-9.

A signal BTIME gives the driving circuit SDR a timing at which to determine a readout gain for an image-signal amplifier in the driving circuit SDR. Normally, the driving circuit SDR determines readout gains for the respective sensor-array pairs from the voltages of the corresponding monitor signals VP1 to VP9 that are obtained when the signal BTIME goes to "H". Specifically, each of the readout gains is determined by the relationship between the level of a respective one of the monitor signals VP1 to VP9 obtained at the timing of the signal BTIME and a comparative level produced in advance on the basis of gain-determining data transmitted from the control device PRS by using the signals SCLK and SO. In the first embodiment, the comparative level is common to the monitor signals VP1 to VP9.

Reference clock signals CK1 and CK2 are transmitted from the control device PRS to the driving circuit SDR to produce the aforesaid clock signals $\phi$RES, $\phi$VRS, $\phi$HRS and $\phi$SH.

The control device PRS sets the "communication signal CSDR to H" and transmits a predetermined "storage start command" to the driving circuit SDR, so that the sensor unit SNS starts a storage operation.

Thus, the sensor unit SNS performs photoelectric conversion of the subject images formed on the respective sensor arrays of each of the sensor-array pairs, so that electric charge is stored in the photoelectric conversion element parts of the respective sensor arrays. At the same time, the voltages of the monitor signals VP1 to VP9 of the respective subject-luminance monitoring sensors increase. When the voltages reach a predetermined level, the driving circuit SDR individually resets the respective signals /TINT1 to /TINT9 to "L".

The control device PRS receives the signals /TINT1 to /TINT9 and outputs predetermined waveforms as the reference clock signal CK2. The driving circuit SDR produces the clock signals $\phi$SH and $\phi$HRS on the basis of the reference clock signal CK2 and transmits the clock signals $\phi$SH and $\phi$HRS to the sensor unit SNS. The sensor unit SNS outputs the image signal on the basis of the clock signals $\phi$SH and $\phi$HRS, and the control device PRS converts the output VIDEO inputted to the analog input terminal into a digital signal by means of its internal A/D conversion function in synchronism with the reference clock signal CK2 outputted from the control device PRS itself. Then, the control device PRS sequentially stores the digital signal at predetermined addresses of the RAM, and performs predetermined computation for focus detection to obtain the amount of defocus of the photographing zoom lens LNS.

The operations of the driving circuit SDR and the sensor unit SNS are disclosed in U.S. Pat. No. 5,126,777, etc., in connection with a focus detecting device having two pairs of sensor arrays. Hence, the detailed description of the operations of those circuit elements is omitted herein for the sake of simplicity.

The viewfinder display device will be described below.

Figure 5:
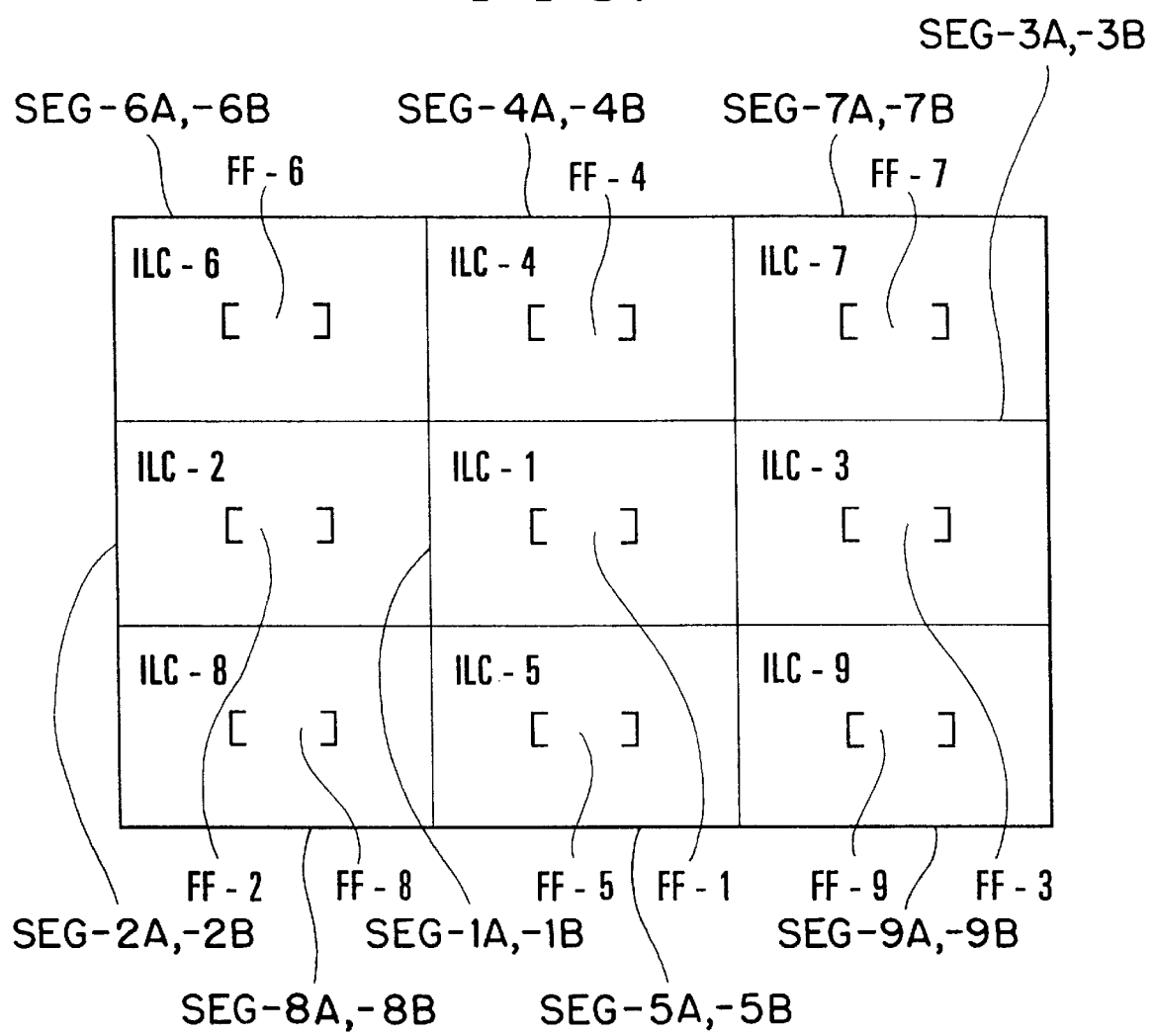
FIG. 5 is a diagram showing the arrangement of the segments of a viewfinder display according to the first embodiment of the present invention.

FIG. 5 is a diagrammatic view of the display segments of a transmission liquid crystal display which is used as the liquid crystal device ILC of the first embodiment. The liquid crystal device ILC includes two glass sheets each having the shown display pattern formed thereon by a transparent electrode called "ITO", the two glass sheets being opposed to each other in such a manner as to be spaced apart from each other by several to some tens of microns, a cell defined between the two glass sheets, and a liquid crystal material, such as a TN or GH material, charged in the cell.

As shown in FIG. 5, the liquid crystal display used in the first embodiment is provided with segments SEG-1A, -1B through SEG-9A, -9B having focus detecting areas FF-1 to FF-9 and light measuring divided areas ILC-1 to ILC-9 which correspond to the focus detecting device and the light measuring device. The focus detecting areas FF-1 to FF-9 are respectively located at the centers of the light measuring divided areas ILC-1 to ILC-9 so that the positions of individual subjects observed in the nine divided areas can be approximately represented.

Figure 6:
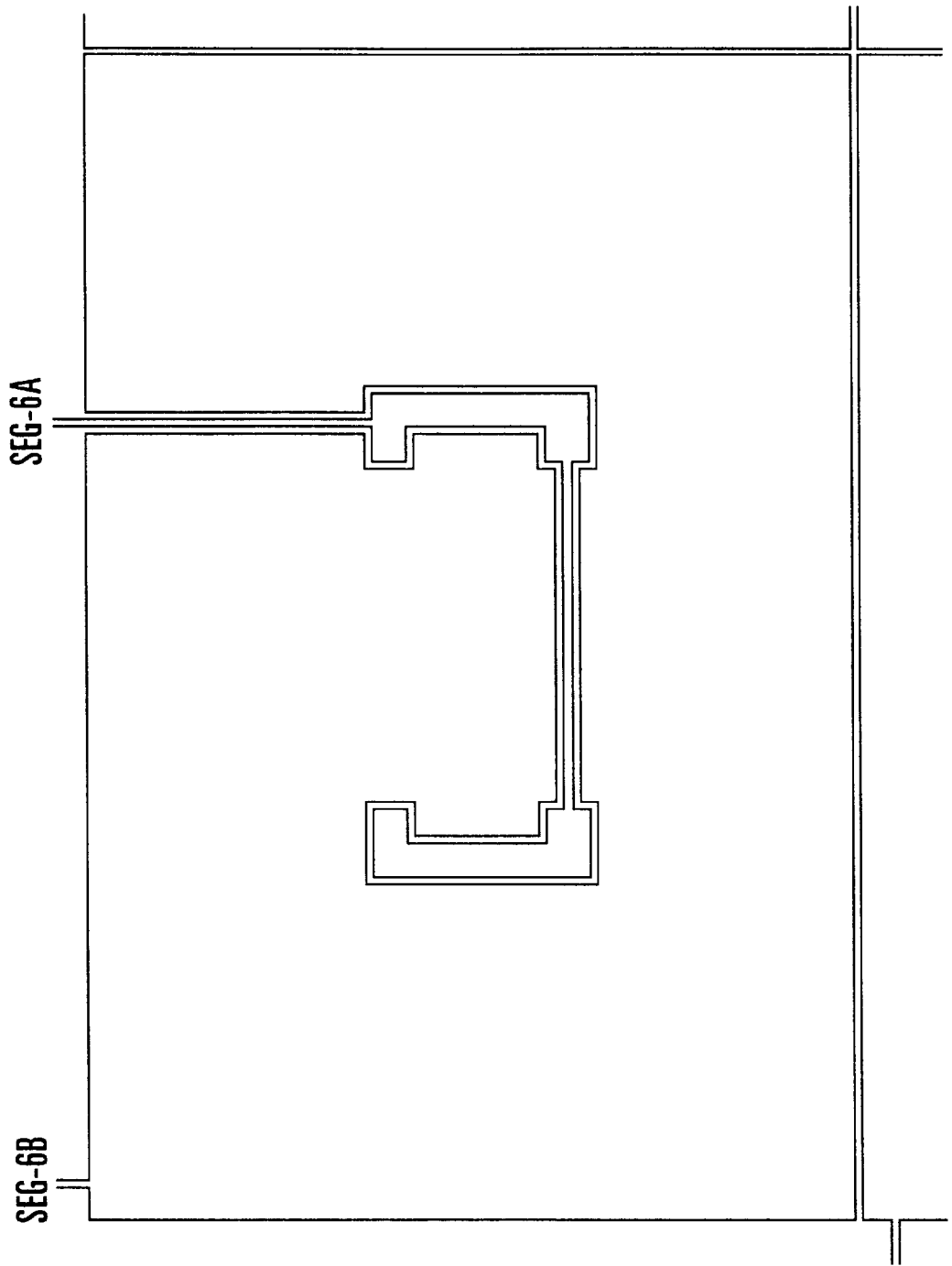
FIG. 6 is an electrode layout view of a viewfinder display device according to the first embodiment of the present invention.

FIG. 6 shows a specific electrode configuration for use in the light measuring divided area ILC-6 and the focus detecting area FF-6.

As shown in FIG. 6, the focus detecting area FF-6 and the light measuring divided area ILC-6 are respectively provided with a focus-detecting-area display segment SEG-6A and a photographic-image-plane divided area display segment SEG-6B. The entire display device, therefore, includes a total of eighteen display segments SEG-1A to SEG-9A and SEG-1B to SEG-9B.

As is apparent from FIG. 6, the focus-detecting-area display segment SEG-6A and the photographic-image-plane divided area display segment SEG-6B are isolated from each other so that they can be independently electrically controlled. In FIG. 6, although the divided area display segments and the leader lines which extend to the respective focus detecting areas are drawn by thick lines, these thick lines are used merely for the convenience of drawing. In practice, the boundaries between the respective divided area display segments are realized with a far finer line width.

Figure 7:
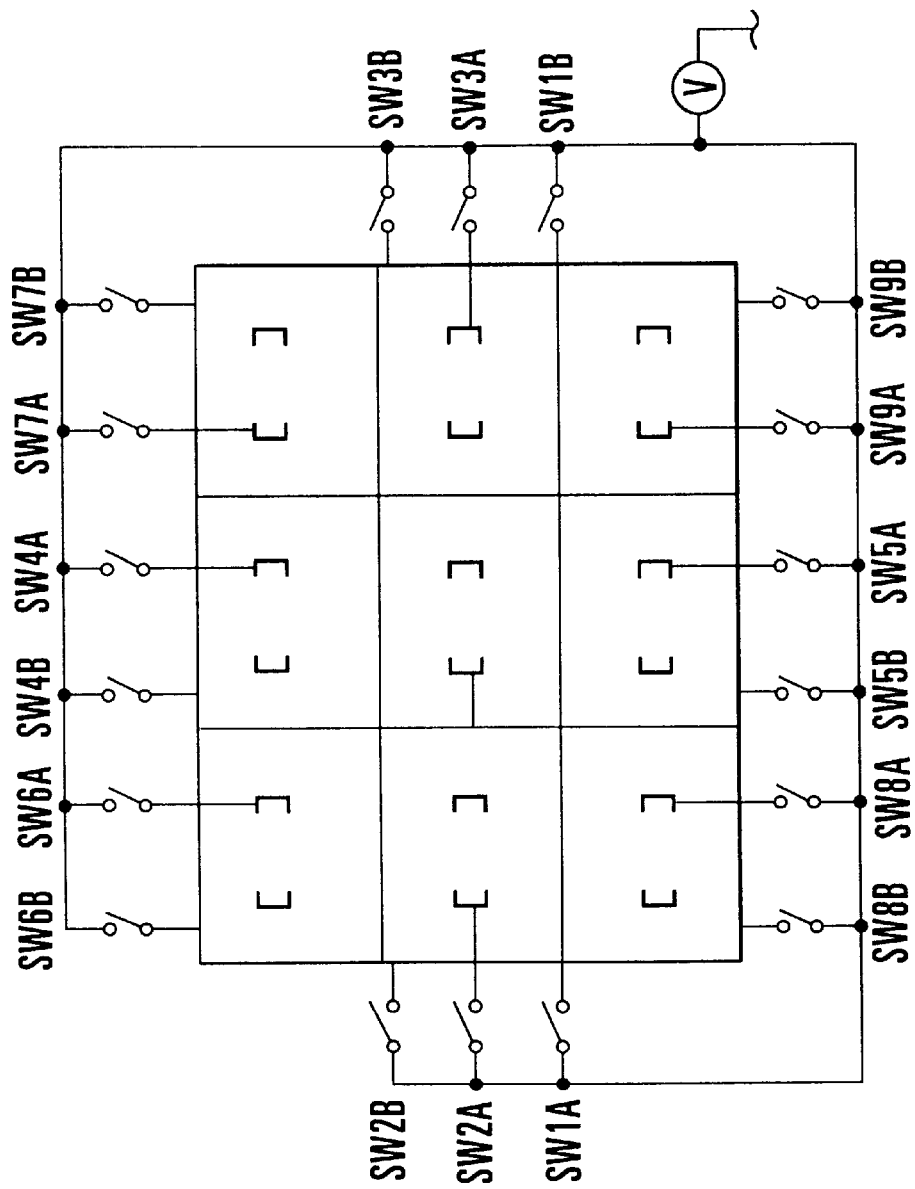
FIG. 7 is an equivalent circuit diagram of the viewfinder display device according to the first embodiment of the present invention.

FIG. 7 schematically shows the display segments of the viewfinder display device ILC and switches and other associated elements for controlling the operational states of the respective display segments.

Eighteen switches SW1A and SW1B to SW9A and SW9B are provided for respectively providing on/off control over the display segments SEG-1A to SEG-9A and SEG-1B to SEG-9B in such a way that, for example, the switches SW1A and SW1B can be used to perform on/off control of the display segments SEG-1A and SEG-1B.

Specific display states and the on/off states of the respective display switches SW1A to SW9B are will be described below. In the following description, by way of example, reference will be made to a positive display in which when a particular display switch is turned on, the corresponding display segment provides a visual display, whereas when it is turned off, the display segment becomes transparent.

Figure 8:
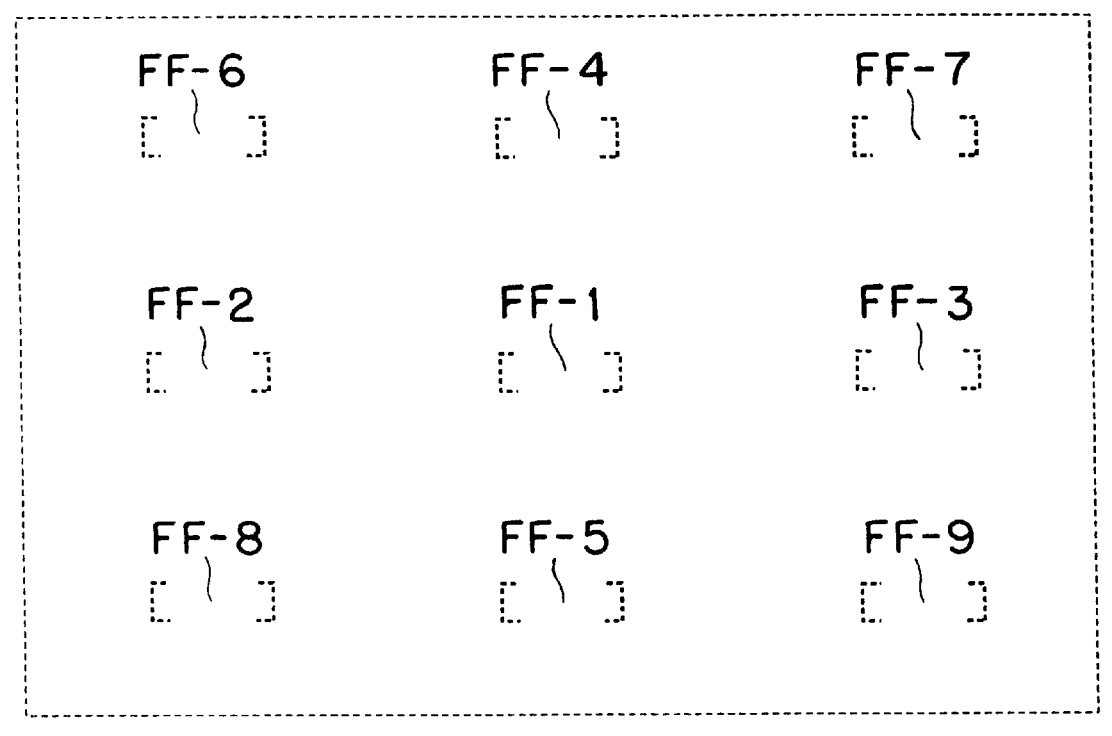

FIG. 8 shows a standard display state which is provided at the beginning of automatic focus adjustment and exposure control, and only the display segments SEG-1A to SEG-9A located in the respective focus detecting areas FF-1 to FF-9 are visually displayed, i.e., only the switches SW1A to SW9A are on.

Figure 9:
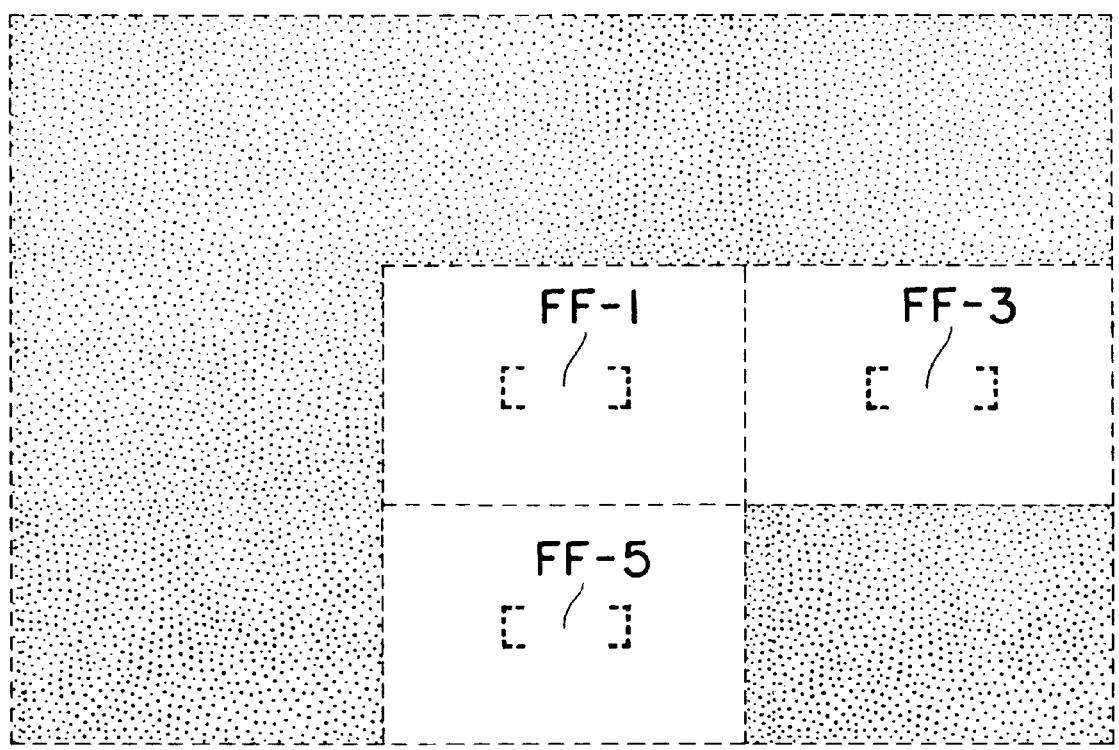
FIG. 9 is a view of another display state of the viewfinder display device according to the first embodiment of the present invention.

FIG. 9 shows a display state in which the following segments are visually displayed: all the segments (SEG-2A, SEG-2B; SEG-4A, SEG-4B; SEG-6A, SEG-6B TO SEG-9A, SEG-9B) of the photographic-image-plane divided areas ILC-2, ILC-4 and ILC-6 to ILC-9 except for ILC-1, ILC-3 and ILC-5, as well as the segments SEG-1A, SEG-3A and SEG-5A of the focus detecting areas FF-1, FF-3 and FF-5 in the divided areas ILC-1, ILC-3 and ILC-5. This indicates that an in-focus state or correct exposure has been obtained in each of the divided areas ILC-1, ILC-3 and ILC-5 by focus detection and adjustment or light measurement. All the switches other than the switches SW1B, SW3B and SW5B are turned on.

Figure 10:
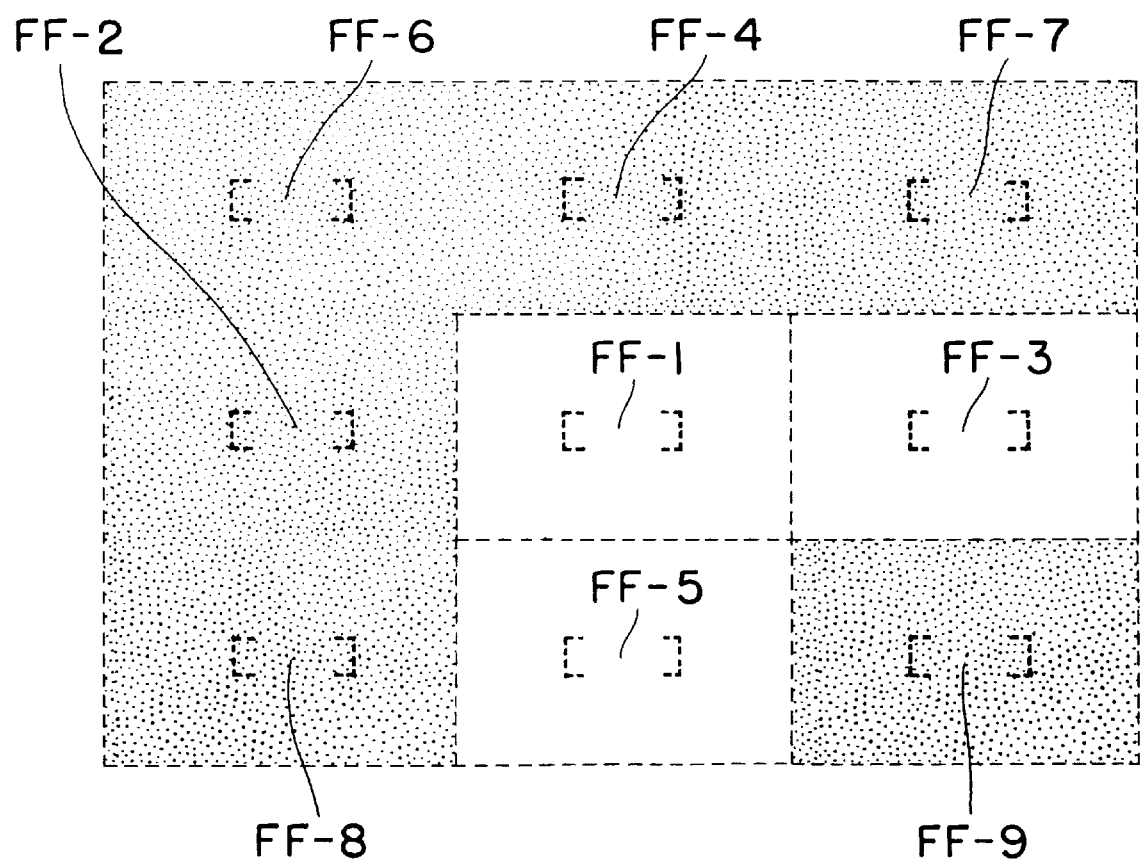
FIG. 10 is a view of another display state of the viewfinder display device according to the first embodiment of the present invention.

As shown in FIG. 9, in all the divided areas other than the divided areas ILC-1, ILC-3 and ILC-5, the focus detecting areas FF-2, FF-4 and FF-6 to FF-9 which respectively indicate out-of-focus states are difficult to visually identify, because they are covered with the darkness of the corresponding divided areas. To cope with this problem, as shown in FIG. 10, the respective focus detecting areas in the visually displayed, divided areas may be made undisplayed so that a photographer can easily recognize the positions of the focus detecting areas. In this case, the switches SW1A, SW3A, SW5A, SW2B, SW4B, SW6B to SW9B are on.

To inform the photographer of the current status in far plainer form, it is preferable to adopt another arrangement which allows the focus-detecting-area display segments and the divided area display segments to effect clearly distinct display operations.

For example, an arrangement having the following operation may be adopted. If it is determined from a focus detecting and adjusting operation that there is a divided area in which the subject image is in focus, the corresponding focus-detecting-area display segment is made unrecognizable, whereas if it is determined that there is a divided area in which correct exposure is possible, the corresponding divided area display segment is made undisplayed. Accordingly, if there is a divided area in which the subject image is in focus and correctly exposed, the divided area is made completely undisplayed, whereas if there is a divided area in which the subject image is in focus and incorrectly exposed, both the divided area display segment and the focus-detecting-area display segment are visually displayed so that the display of the focus-detecting-area display segment cannot be distinguished from the display of the divided area display segment. In addition, if there is a divided area in which the subject image is out of focus and incorrectly exposed, only the divided area display segment is visually displayed and the focus-detecting-area display segment is made undisplayed and recognizable. If there is a divided area in which the subject image is out of focus and correctly exposed, only the focus-detecting-area display segment is visually displayed.

Figure 11:
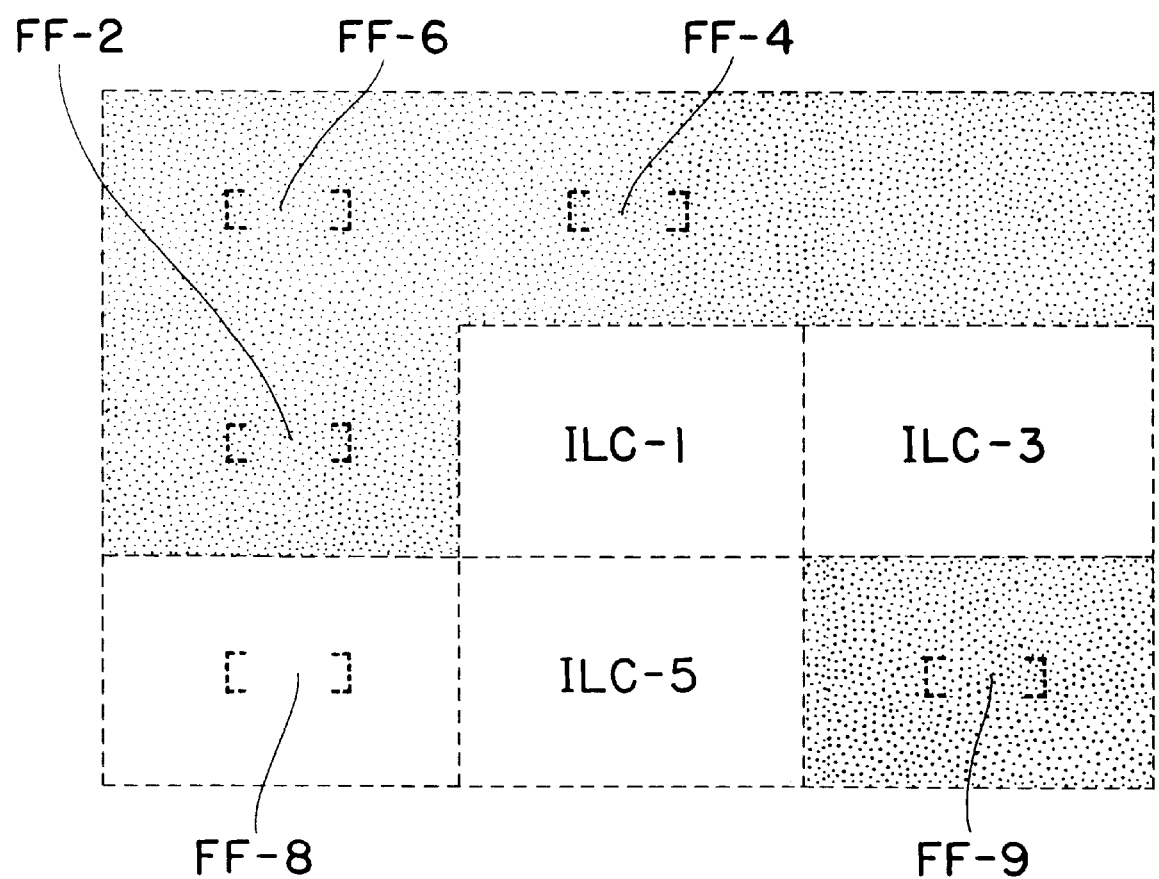
FIG. 11 is a view of another display state of the viewfinder display device according to the first embodiment of the present invention.

FIG. 11 shows a modification having the above-described construction. In FIG. 11, the divided areas ILC-1, ILC-3 and ILC-5 are the areas in which the respective subject images are in focus and correctly exposed, the divided area ILC-7 is the area in which the subject image is in focus and incorrectly exposed, and the divided area ILC-8 is the area in which the subject image is out of focus and correctly exposed. The other divided areas ILC-2, ILC-4, ILC-6 and ILC-9 are the areas in which the respective subject images are out of focus and incorrectly exposed. In this case, the switches SW7A, SW8A, SW2B, SW4B, SW6B, SW7B and SW9B are on.

The above-described first embodiment is arranged to perform focus detection and light measurement for each divided area.

However, as can also be seen from the accompanying drawings, if the number of focus detecting areas are increased, the complexity and expensiveness of both the optical system and the sensors will increase to a great extent as compared with an increase in the number of divided light measurement areas.

To cope with this problem, focus detection and adjustment may be performed on the basis of representative divided areas (for example, three divided areas) selected from the photographic image plane, and the state of focus for each area is determined on the basis of distance images which are displayed with the photographic image plane divided. This arrangement makes it possible to provide a system whose photographic image plane is easy to divide and which is very advantageous in terms of cost.

Figure 12:
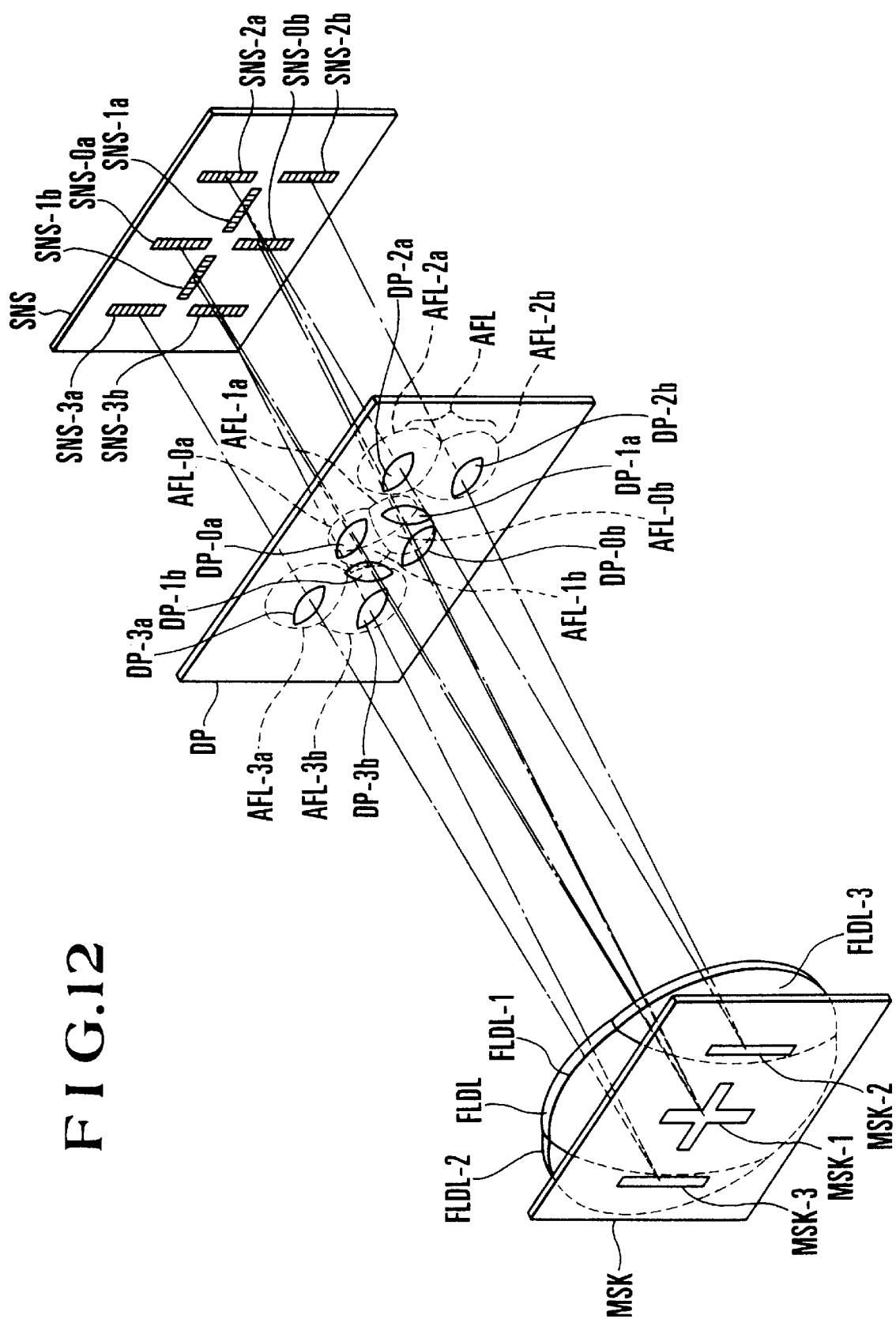
FIG. 12 is a diagrammatic view showing the construction of a focus detecting device according to a second embodiment of the present invention.

FIG. 12 is a diagrammatic view showing the construction of a focus detecting device capable of three-point focus detection, which is similar to the nine-point focus detecting device shown in FIG. 2. In FIG. 12, the same reference numerals are used to denote constituent elements similar to those shown in FIG. 2. The focus detecting device shown in FIG. 12 has the opening MSK-1, sensor arrays SNS-0a and SNS-0b and the sensor arrays SNS-1a and SNS-1b, all of which are located in the center of the photographic image plane so as to effect vertical and horizontal detection of focus, as well as the openings MSK-2 and MSK-3 and the sensor arrays SNS-2a and SNS-2b and the sensor arrays SNS-3a and SNS-3b, all of which are located on the right and left sides of the photographic image plane so as to effect vertical detection of focus. As can be seen from FIG. 12, a very simple structure is realized as compared with the focus detecting device shown in FIG. 2.

Figure 13:
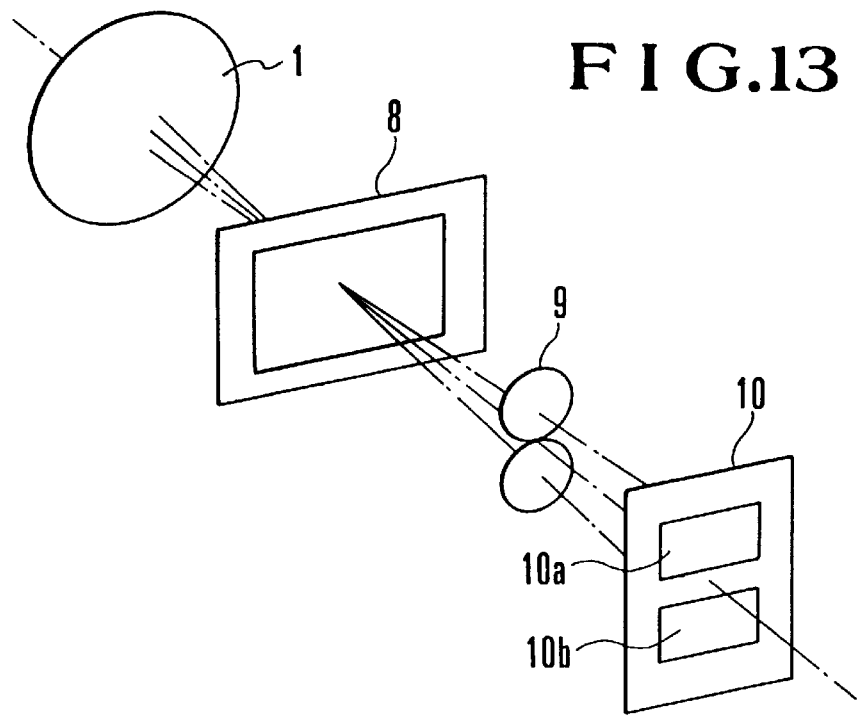
FIG. 13 is a schematic view showing the construction of a distance image detecting device according to the second embodiment of the present invention.

FIG. 13 is a diagram showing the optical arrangement of constituent elements for finding distance images. The arrangement shown in FIG. 13 includes a photographic lens 1, a field lens 8 for finding distance images, a secondary image forming lens 9 for the same purpose, and an area sensor 10 for the same purpose. The area sensor 10 has two image-pickup planes 10a and 10b, and light fluxes are conducted from different pupil positions of the photographic lens 1 toward the respective image-pickup planes 10a and 10b of the area sensor 10 and are again focused on the image-pickup planes 10a and 10b at the image-forming magnification determined by the field lens 8 and the secondary image forming lens 9. The area sensor 10 is disposed at a position optically equivalent to a photographic film plane with respect to the photographic lens 1, and each of the image-pickup planes 10a and 10b has a field of view equal to that of the photographic image plane.

Figure 14:
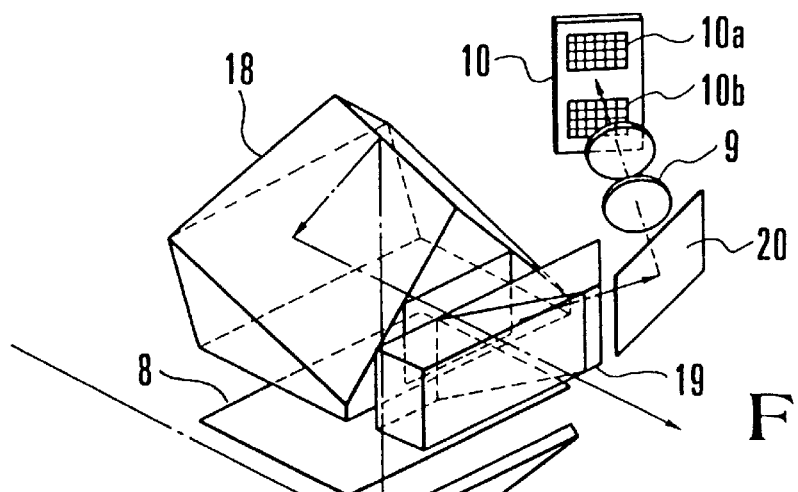
FIG. 14 is a diagrammatic perspective view showing the in-camera layout of the distance image detecting device according to the second embodiment of the present invention.

FIG. 14 is a schematic view showing a layout in which the distance image detecting system shown in FIG. 13 is applied to a camera of the type shown in FIG. 1. The layout shown in FIG. 14 includes a quick return mirror 6, a pentagonal prism 18, a dividing prism 19, a reflecting mirror 20 and the constituent elements shown in FIG. 13.

Figure 15:
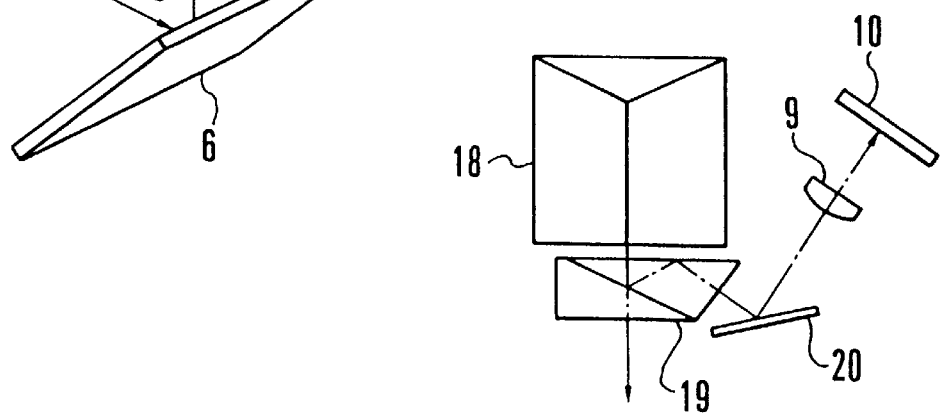
FIG. 15 is a top plan view showing the in-camera layout of the distance image detecting device according to the second embodiment of the present invention.

FIG. 15 is a view showing the layout of FIG. 14 in top plan.

In the above-described arrangement, the distance from a subject in each divided area of the photographic image plane is found from the image-pickup planes 10a and 10b each having a predetermined parallax, whereby distance images are obtained. This system is disclosed in detail in U.S. patent application Ser. No. 08/332,870 and the like.

FIG. 16 is a schematic view showing the arrangement of area division of the light measuring sensor SPC according to a second embodiment of the present invention. As shown, in the second embodiment, the photographic image plane is divided into fifteen areas. Accordingly, each of the image-pickup planes 10a and 10b of the area sensor 10 shown in FIG. 13 and so on is divided into fifteen areas.

Figure 17:
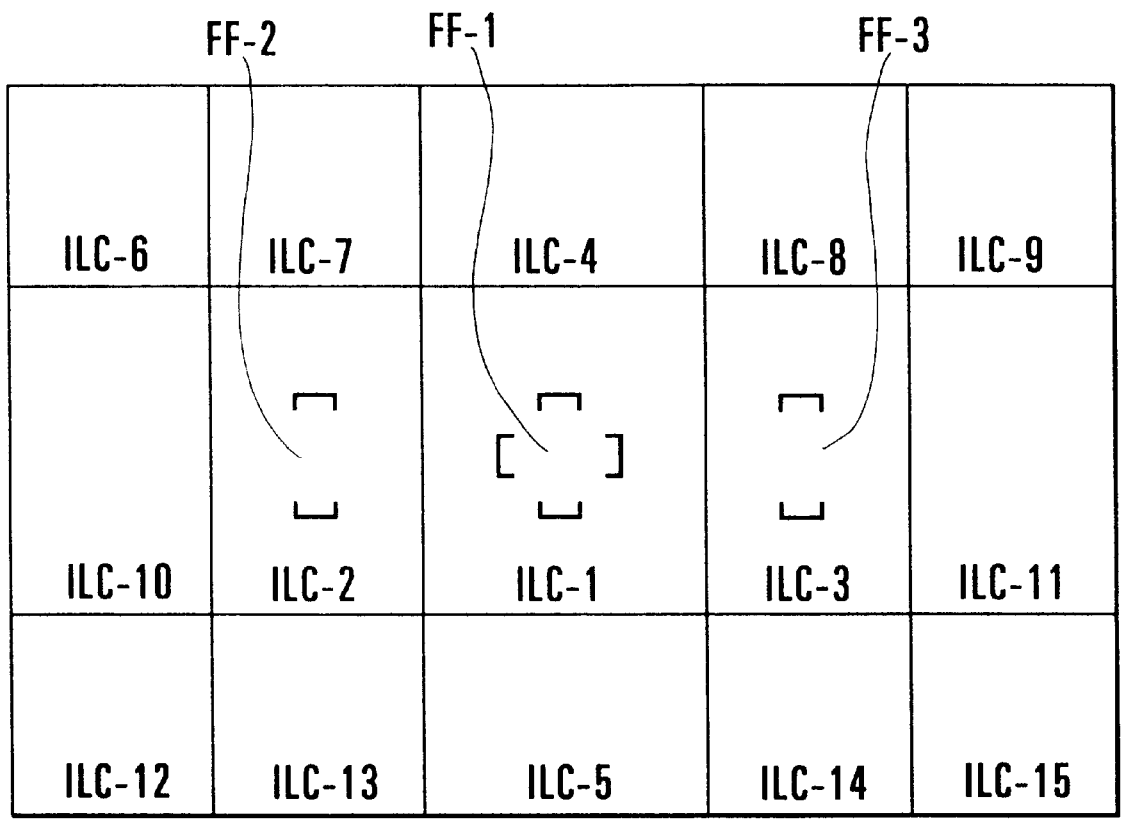
FIG. 17 is a diagram showing the arrangement of the segments of a viewfinder display according to the second embodiment of the present invention.

FIG. 17 is a diagrammatic view of the display segments of a liquid crystal display which is provided with the focus detecting areas FF-1 to FF-3 and the light measuring divided areas ILC-1 to ILC-15 which correspond to the focus detecting device and the light measuring device according to the second embodiment. In the second embodiment, a total of three focus detecting areas are respectively provided in the central divided areas ILC-1, ILC-2 and ILC-3 of the photographic image plane.

Figure 18:
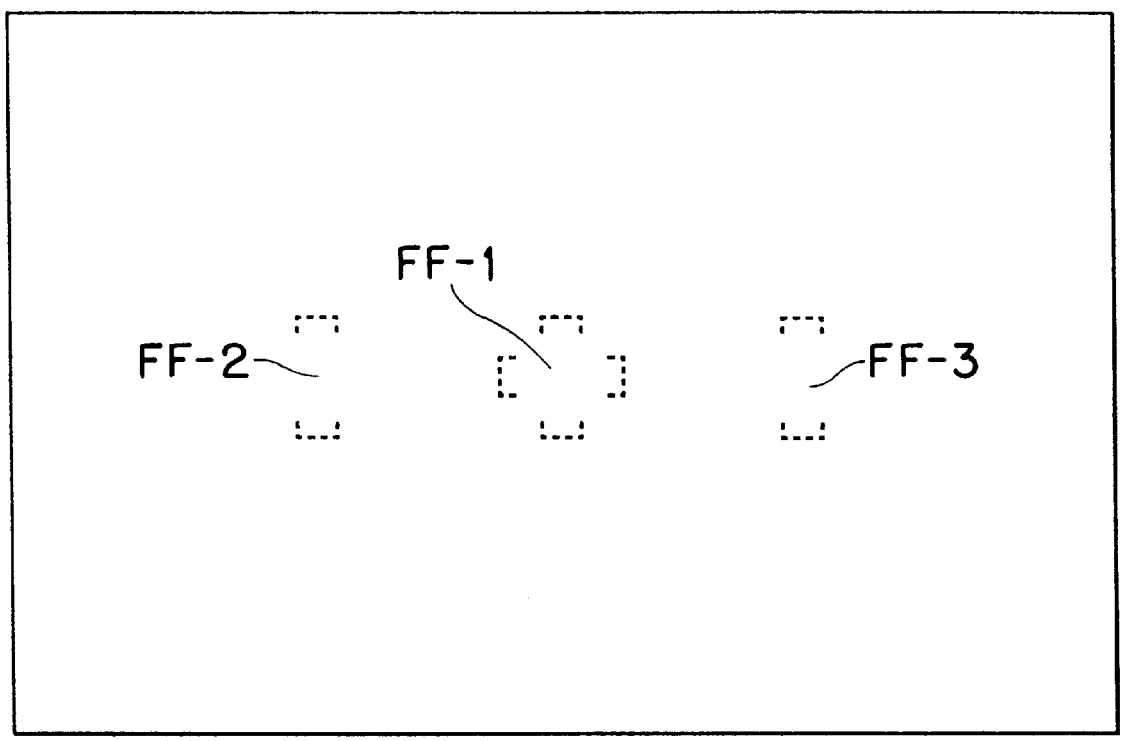
FIG. 18 is a view of a display state of a viewfinder display device according to the second embodiment of the present invention.

FIG. 18 is a view similar to FIG. 8, but shows a standard display state which is provided at the beginning of automatic focus adjustment and exposure control in the second embodiment. As shown in FIG. 18, only the display segments located in the respective focus detecting areas FF-1 to FF-3 are visually displayed.

Figure 19:
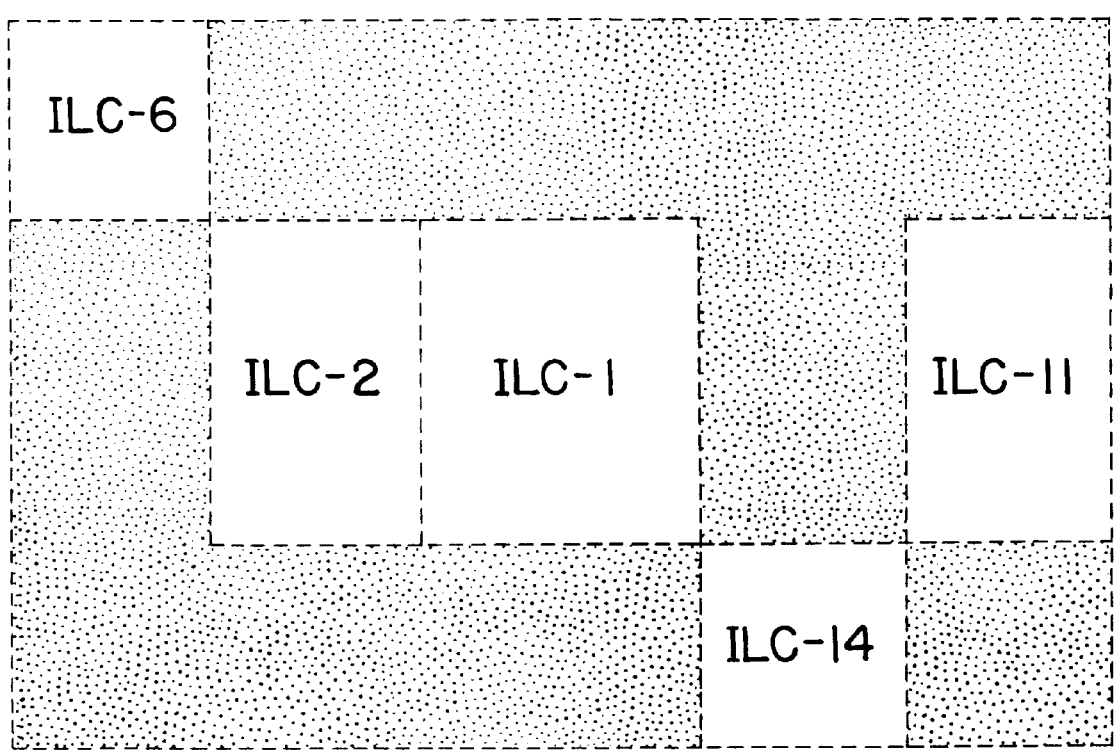
FIG. 19 is a view of another display state of the viewfinder display device according to the second embodiment of the present invention.

FIG. 19 is a schematic view of the result of focus detection and adjustment or light measurement according to the second embodiment, and shows that subject images are in focus or correctly exposed in the respective divided areas ILC-1, ILC-2, ILC-6, ILC-11 and ILC-14.

Focus adjustment is performed by determining whether a main subject is in focus, from the result of a focus detecting operation for each of the divided areas ILC-1, ILC-2 and ILC-3. FIG. 19 shows that it is determined that the subject images in the divided areas ILC-1 and ILC-2 are in focus. Regarding the other divided areas, if it is determined from the distance images that there is a divided area in which the subject distance is equal to that in each of the divided areas ILC-1 and ILC-2, it is determined that the subject image in the divided area is in focus. FIG. 19 shows that it is determined from the distance images that the subject images in the respective divided areas ILC-6, ILC-11 and ILC-14 are in focus.

Although the first and second embodiments have been described with reference to the positive display, the present invention is not limited to the positive display, and can also be applied to a negative display. The kinds of usable liquid crystal are not only TN liquid crystal and GH liquid crystal but also polymer dispersion liquid crystal (PDLC).

The display pattern is not limited to any of those used in the aforesaid embodiments. For example, in the second embodiment in which the focus detecting areas are provided in part of the divided areas, a state-of-focus display and a state-of-exposure display may also be set by separate segments for each of the divided areas.

The first and second embodiments have been described with reference to the case in which the present invention is applied to a single-lens reflex camera having a quick return mirror, a pentagonal prism and the like. However, the present invention is not limited to such an application, and is also very effectively applicable to a so-called compact camera such as a lens-shutter camera.

In general, since lens-shutter cameras are arranged to perform automatic focus adjustment immediately before photography, it is difficult for photographers to confirm the result of automatic focus adjustment through viewfinder optical systems. For this reason, it can also be said that the present invention exactly proves its merit when it is applied to this kind of camera.

In general, the automatic focus adjustment function of such a lens-shutter camera is not of a type (so-called TTL) in which focus is detected by using a light flux passing through a photographic lens, as in the case of the first and second embodiments, but of a type (external focus measurement system) which uses a distance measuring mechanism employing an optical system separate from a photographic optical system.

Figure 20:
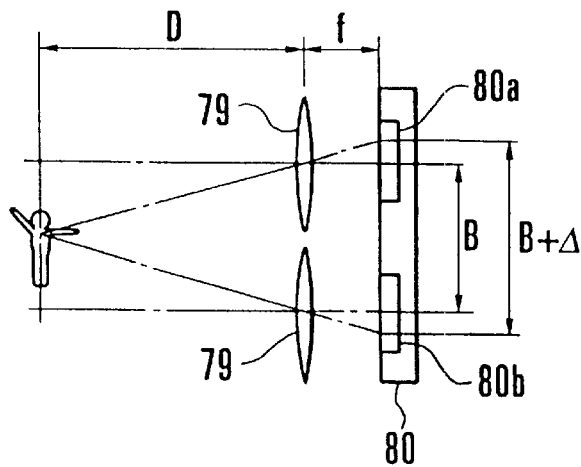
FIG. 20 is a schematic view showing the construction of a distance image detecting device according to a third embodiment of the present invention.

FIG. 20 is a schematic view showing the optical arrangement of each constituent element for finding distance images similar to those of FIG. 13 without using a photographic lens or a field lens.

In FIG. 20, reference numeral 79 denotes an image-pickup lens for finding a distance image, and D represents a subject distance, f represents the optical distance between each of the image-pickup lenses 79 and the corresponding one of image-pickup planes 80a and 80b of an area sensor 80, and B represents a base length. If a subject is at infinity, the interval between two distance images is equal to the base length B, and if a subject is at a finite distance, the interval increases to B+Δ. This relationship is represented as D/B= f/Δ, and the distance to a subject can be obtained from the interval between the two distance images.

Figure 21:
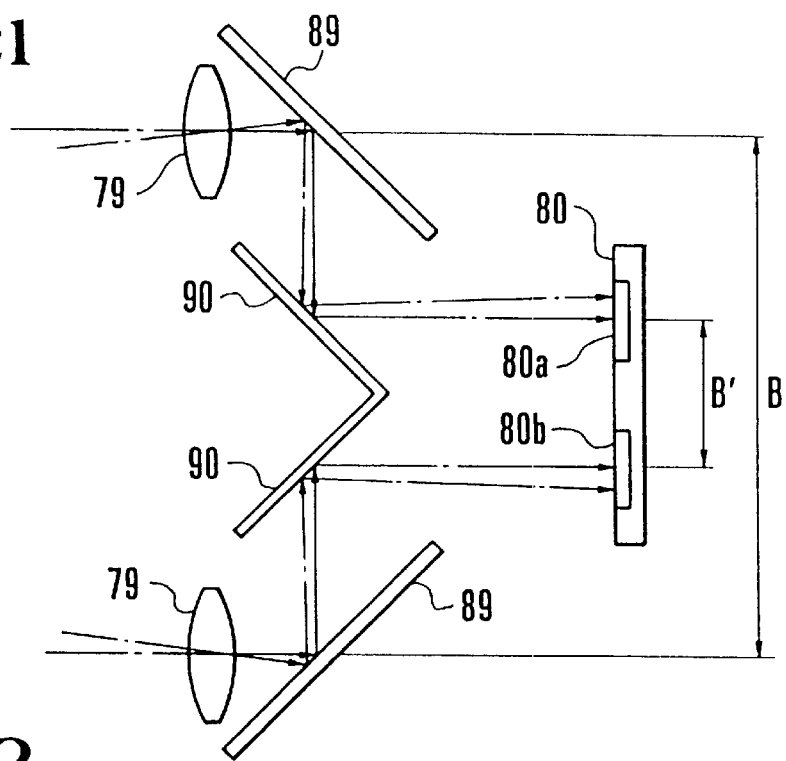
FIG. 21 is a diagrammatic view showing the in-camera layout of the distance image detecting device according to the third embodiment of the present invention.
Figure 22:
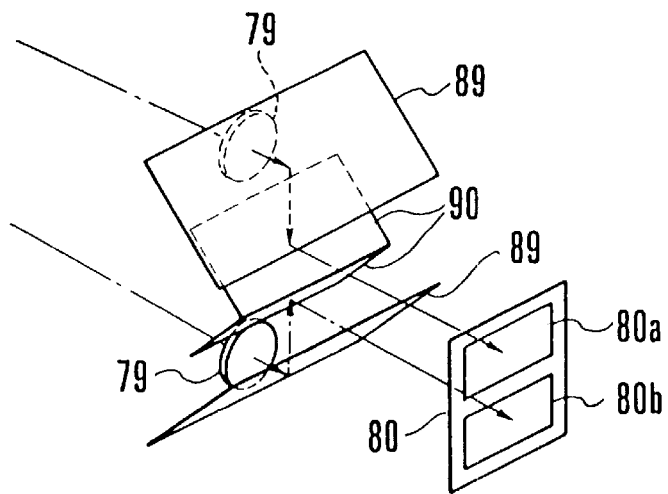
FIG. 22 is a diagrammatic perspective view showing the in-camera layout of the distance image detecting device according to the third embodiment of the present invention.

FIG. 21 is a view showing the optical positional relationship of the distance image detecting device shown in FIG. 20 which is incorporated in a practical camera, and FIG. 22 is a perspective view of the device of FIG. 20. In the distance image detecting device shown in FIGS. 20 and 21, reflecting mirrors 89 and 90 serve to conduct light fluxes distant from each other by the base length B to the respective image-pickup planes 80a and 80b distant from each other by an interval B'. (This system is also disclosed in U.S. patent application Ser. No. 08/332,870.)

By adopting an arrangement in which focus adjustment and subject recognition are performed on the basis of the distance images obtained in this manner and the result is displayed in a viewfinder, it is possible to realize a photographic apparatus of good operability.

According to each of the above-described embodiments, there is provided an arrangement which makes it possible to identify the result of focus detection for each divided area of a photographic image plane through a variation in the transmittance of each divided area within a viewfinder display. In the case of a photographic apparatus such as a camera using this arrangement, a photographer can understand, as an area, which portion of a subject is in focus.

In addition, as compared with a divided area in which an in-focus state is achieved, the transmittance of the other divided areas is made low, so that only the divided area in which the in-focus state is achieved can be clearly viewed compared to the other divided areas. Accordingly, the photographer can readily identify the result of focus detection.

In addition, the arrangement makes it possible to identify a subject luminance for each divided area through a variation in the transmittance of each divided area within the viewfinder display which variation is caused on the basis of exposure information determined from the detection result provided by light measuring means. In the case of a photographic apparatus such as a camera using this arrangement, the photographer can understand, as an area, which portion of a subject is correctly exposed.

In addition, since area division by the light measuring means and that by display means are made approximately coincident with each other, the photographer can identify the result of light measurement more accurately.

In addition, as compared with a divided area in which correct exposure is obtained, the transmittance of the other divided areas is made low on the basis of the exposure information, so that only the divided area in which correct exposure is obtained can be clearly viewed compared to the other divided areas. Accordingly, the photographer can readily identify the result of light measurement.

What is claimed is:

1. An optical apparatus having a viewfinder display, comprising:

focus detection means for performing focus detection in each of a plurality of focus detection areas provided on a photographic image plane;

a light measurement mechanism for performing brightness detection in each of a plurality of brightness detection areas provided on the photographic image plane;

a display device which displays simultaneously in a superimposed manner on said viewfinder a plurality of first display areas corresponding to the plurality of focus detection areas and a plurality of second display areas corresponding to the plurality of brightness detection areas; and a control circuit for changing a transmission rate of each of the plurality of first display areas in the display device according to the focus detection result by the focus detection means and for changing a transmission rate of each of the plurality of second display areas in the display device according to the brightness detection result by the light measurement mechanism.

2. An optical apparatus according to claim 1, wherein said plurality of first display areas overlaps with said plurality of second display areas.

3. An optical apparatus according to claim 1, wherein said control circuit differentiates a transmission rate of a first display area in which an in-focus state is achieved according to the focus detection result by the focus detection means from a transmission rate of another first display area, and differentiates a transmission rate of a second display area corresponding to a brightness detection area in which a correct exposure is achieved according to the brightness detection result by the light measurement mechanism from a transmission rate of another second display area.

4. An optical apparatus according to claim 1, wherein said control circuit includes a microcomputer.

5. An optical apparatus according to claim 1, wherein said display device is disposed adjacent to an image forming position in a viewfinder optical system in such a manner as to be superimposed on an viewfinder optical image.

6. An optical apparatus according to claim 1, wherein said display device is a transmission liquid crystal display.

7. An optical apparatus having a viewfinder display, comprising:

focus detection means for performing focus detection in each of a plurality of focus detection areas provided on a photographic image plane;

a light measurement mechanism for performing brightness detection in each of a plurality of brightness detection areas provided on the photographic image plane;

a display device which displays simultaneously in a superimposed manner on said viewfinder a plurality of first display areas corresponding to the plurality of focus detection areas and a plurality of second display areas corresponding to the plurality of brightness detection areas; and a control circuit for changing a display state of each of the plurality of first display areas in the display device according to the focus detection result by the focus detection means and for changing a display state of each of the plurality of second display areas in the display device according to the brightness detection result by the light measurement mechanism.

8. An optical apparatus according to claim 7, wherein said plurality of first display areas overlaps with said plurality of second display areas.

9. An optical apparatus according to claim 7, wherein said control circuit differentiates a display state of a first display area in which an in-focus state is achieved according to the focus detection result by the focus detection means from a display state of another first display area, and differentiates a display state of a second display area corresponding to a brightness detection area in which a correct exposure is achieved according to the brightness detection result by the light measurement mechanism from a display state of another second display area.

10. An optical apparatus according to claim 7, wherein said control circuit includes a microcomputer.

11. An optical apparatus according to claim 7, wherein said display device is disposed adjacent to an image forming position in a viewfinder optical system in such a manner as to be superimposed on a viewfinder optical image.

12. An optical apparatus according to claim 7, wherein said display device is a transmission liquid crystal display.

* * * * *